United States Patent Office 3,755,582
Patented Aug. 28, 1973

3,755,582
QUINAZOLINONE FUNGICIDES
Greg Alan Bullock, Wilmington, Del., assignor to E. I. du Pont de Nemours and Company, Wilmington, Del.
No Drawing. Filed Mar. 4, 1971, Ser. No. 121,143
Int. Cl. A01n 9/12, 9/22
U.S. Cl. 424—251
6 Claims

ABSTRACT OF THE DISCLOSURE

A group of substituted 4(3H)-quinazolinone compounds are useful as fungicides. An exemplary compound of the group is 3 - allyl - 6-chloro-2-methylthio-4(3H)-quinazolinone.

BACKGROUND OF THE INVENTION

This invention relates to the use of a group of substituted 4(3H)-quinazolinone compounds to prevent or mitigate damage to plants by fungi.

It has been discovered that application of the substituted 4(3H)-quinazolinones defined herein reduces or prevents damage to plants by fungi. Fungus mycelia are killed or prevented from developing further by the presence of one or more of the compounds, i.e. the compounds have been found to be fungicidal or fungistatic.

SUMMARY OF THE INVENTION

It has been found that the above outstanding fungicidal activity can be obtained by applying to the locus of infection, the compounds represented by the following formula:

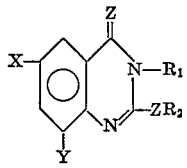

wherein:

Z is oxygen or sulfur;
X and Y are selected from the group consisting of hydrogen, halogen, alkyl of 1 to 4 carbon atoms, or alkoxy of 1 to 4 carbon atoms with the proviso that X and Y cannot both be hydrogen;
$R_1$ is alkyl of 1 to 12 carbon atoms, alkenyl of 3 to 8 carbon atoms, alkynyl of 3 to 8 carbon atoms, cycloalkyl of 3 to 8 carbon atoms, cycloalkenyl of 5 to 8 carbon atoms, cycloalkylalkyl of 4 to 9 carbon atoms, $R_1$ may be substituted with alkyl, halogen, alkoxy, hydroxy, cyano, carboxy, or alkoxy carbonyl;
$R_2$ is alkyl of 1 to 12 carbon atoms, alkenyl of 3 to 8 carbon atoms, alkynyl of 3 to 8 carbon atoms, cyclohexenyl, cycloalkyl of 3 to 8 carbon atoms, benzyl, cyanoalkyl of 1 to 12 carbon atoms, alkoxyalkyl of 2 to 4 carbon atoms or alkylthioalkyl of 2 to 4 carbon atoms.

Preferred because of their biological activity are those compounds wherein Z is sulfur; X is chlorine; Y is hydrogen; and $R_1$ and $R_2$ are selected from the group consisting of alkyl of 1 to 4 carbon atoms, alkenyl of 3 to 4 carbon atoms, and alkynyl of 3 to 4 carbon atoms.

The most preferred compound is 6 - chloro-3-allyl-2-methylthio-4(3H)-quinazolinone.

DETAILED DESCRIPTION OF THE INVENTION

Those quinazolinones of Formula I can be prepared by methods heretofore described in the literature. For example, one method for the preparation of these compounds is illustrated by the following equations:

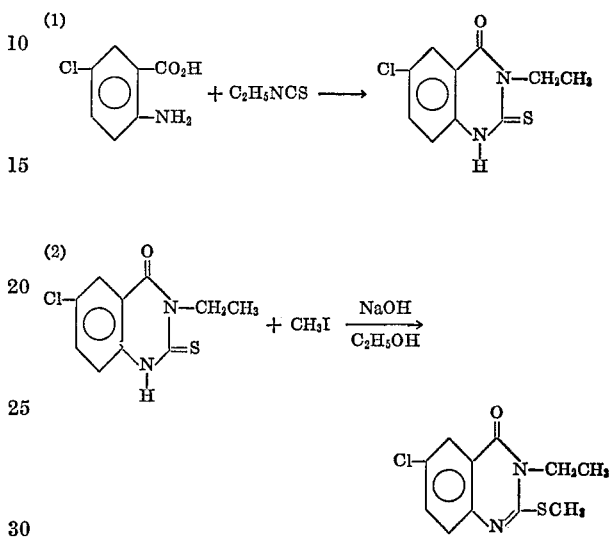

For more general details, note the publication by Bhargava and Choubey in J. Med. Chem. 12, 553 (1969).

In the method of Equations 1 and 2, the substituted anthranilic acids are reacted with an isothiocyanate in alcohol and heated for a short interval of time at reflux temperature. The reaction mixture is then cooled and the crude 3-substituted-2-thioquinazolinedione is removed by filtration. This can be reacted without further purification with an alkyl, alkenyl, alkynyl, cycloalkyl, cyclohexenyl or benzyl halide in alcoholic alkaline solution at room temperature for a period of one hour. The corresponding substituted quinazolinone separates as an essentially pure solid. Sodium hydride in tetrahydrofuran may also be used in place of alcoholic alkaline solution for the preparation of the substituted quinazolinones.

EXAMPLES

In order that the invention may be better understood, the following examples are given for the purpose of illustrating preparation of the active ingredients.

Example 1.—Preparation of 6-chloro-3-ethyl-2-methylthio-4(3H)-quinazolinone

Nine parts of 5-chloroanthranilic acid is added to a stirred solution of five parts of ethyl isothiocyanate in 50 parts of ethanol. The suspension is stirred and refluxed for four hours, cooled, and the precipitated 2-thioquinazolinedione is collected by filtration and air dried. Five parts of essentially pure 6-chloro-3-ethyl-2-thio-4(3H)-quinazolinedione is obtained. This compound is then combined with five parts of methyl iodide and 50 parts of 10% ethanolic sodium hydroxide and stirred for one hour at room temperature, whereupon a white solid separates. This solid is collected by filtration to give three parts of crude 6-chloro-3-ethyl-2-methylthio-4(3H)-quinazolinone, melting at 111° to 122° C. It is then recrystallized from ethanol to give two parts of pure 6-chloro-3-ethyl-2-methylthio-4(3H)-quinazolinone, melting at 109–112° C.

Example 2.—Preparation of 6-chloro-3-ethyl-2-hexylthio-4(3H)-quinazolinone

Ten parts of 6-chloro-3-ethyl-2-thio - 4(3H) - quinazolinedione (from Example 1) is combined with one part of sodium hydride in 80 parts of tetrahydrofuran and stirred and refluxed for one hour. Nine parts of n-hexyl iodide is added and the suspension is stirred and refluxed for an additional two hours. The solvent is then evaporated to dryness under reduced pressure and the resulting residue is diluted with 80 parts of water. This aqueous suspension is extracted with 75 parts of methylene chloride. The methylene chloride layer is separated, dried over magnesium sulfate and concentrated under reduced pressure to give seven parts of 6-chloro-3-ethyl - 2 - hexylthio - 4(3H) - quinazolinone as a yellow oil.

Example 3.—Preparation of 6-chloro-2-allyl-2-methylthio-4(3H)-quinazolinone

Nine parts of 5-chloroanthranilic acid is added to a stirred solution of five parts of allyl isothiocyanate in 50 parts of ethanol. The suspension is stirred and refluxed for four hours, cooled, and the precipitated thioquinazolinedione is collected by filtration and air dried. Five parts of essentially pure 6-chloro - 3 - allyl-2-thio-4(3H)-quinazolinedione is obtained. All of this compound is combined with one-half part of sodium hydride in 60 parts of tetrahydrofuran and stirred and refluxed for one hour. Three parts of methyl iodide is added and the suspension is stirred and refluxed for two hours. The solvent is then evaporated to a semisolid under reduced pressure. Dilution with 8 parts of water produces a white solid which is collected by filtration, washed well with water and air dried. This compound is then recrystallized from a mixture of ethanol and water to give four parts of pure 6-chloro - 3 - allyl - 2 - methylthio-4(3H)-quinazolinone, melting at 105.5–107.5° C.

Example 4.—Preparation of 6-chloro-3-allyl-2-allylthio-4(3H)-quinazolinone

Ten parts of 6-chloro - 3 - allyl - 2 - thio-4(3H)-quinazolinedione (from Example 3) is combined with one part of sodium hydride in 80 parts of tetrahydrofuran and stirred and refluxed for one hour. Five parts of 3-bromopropene is added and the suspension is stirred and refluxed for an additional two hours. The suspension is concentrated under reduced pressure and then diluted with ten parts of water, whereupon a white solid separates. It is recrystallized from a mixture of ethanol and water is give 7.5 parts of pure 6 - chloro - 3 - allyl - 2 - allylthio-4(3H)-quinazolinone, melting at 70.5–72.5° C.

Example 5.—Preparation of 8-methyl-3-ethyl-2-methylthio-4(3H)-quinazolinone

Seventeen parts of 3-methylanthranilic acid is added to a stirred solution of 10 parts ethyl isothiocyanate in 100 parts of ethanol. The suspension is stirred and refluxed for four hours, cooled, and the precipitated thioquinazolinedione is collected by filtration and air dried. Ten parts of essentially pure 8-methyl - 3 - ethyl - 2 - thio-4(3H)-quinazolinedione is obtained. This compound is then combined with one part of sodium hydride in 60 parts of tetrahydrofuran and stirred and refluxed for one hour. Eight parts of methyl iodide is added and the suspension is stirred and refluxed for two hours. The solvent is then evaporated to a semisolid under reduced pressure. Dilution with 100 parts of water causes a white solid to separate. This solid is collected by filtration, washed with water, and dried to give eight parts of essentially pure 8-methyl - 3 - ethyl - 2 - methylthio-4(3H)-quinazolinone, melting at 91.5–92.5° C.

Example 6.—Preparation of 6-methyl-3-ethyl-2-allylthio-4(3H)-quinazolinone

Seventeen parts of 5-methylanthranilic acid is added to a stirred solution of 10 parts of ethyl isothiocyanate in 100 parts of ethanol. The suspension is stirred and refluxed for four hours, cooled, and the precipitated thioquinazolinedione is collected by filtration and air dried. Ten parts of essentially pure 6-methyl - 3 - ethyl-2-thio - 4(3H) - quinazolinedione is obtained. This compound is then combined with one part of sodium hydride in 60 parts of tetrahydrofuran and stirred and refluxed for one hour. Six parts of 3-bromopropene is added and the suspension is stirred and refluxed for two hours. The solvent is evaporated to a semisolid under reduced pressure and then diluted with 100 parts of water, whereupon a white solid separates. It is recrystallized from a mixture of ethanol and water to give eight parts of pure 6-methyl - 3 - ethyl - 2 - allylthio-4(3H)-quinazolinone, melting at 86–87.5° C.

Example 7.—Preparation of 6-chloro-3-ethyl-2-methoxy-4(3H)-quinazolinone

Eight parts of 6-chloro - 3 - ethyl - 2 - methylthio-4(3H)-quinazolinone (from Example 1) is combined with four parts of sodium methoxide and 150 parts of methanol and the solution is stirred and refluxed overnight. The solution is cooled and evaporated under reduced pressure to a white solid. Dilution with 150 ml. of water affords a white solid which is collected by filtration and dried. It is then recrystallized from a mixture of ethanol and water to give one part of pure 6-chloro-3-ethyl - 2 - methoxy - 4(3H) - quinazolinone, melting at 108–109° C.

The following quinazolinones are prepared by the procedure of Example 3 by substituting the listed anthranilic acid for 5-chloroanthranilic acid, by replacing allyl isothiocyanate with the isothiocyanate listed below and by using the alkyl halide listed below in place of methyl iodide.

| Anthranilic acid | Isothiocyanate | Alkyl halide | Quinazolinones |
| --- | --- | --- | --- |
| 5-chloroanthranilic acid | Methyl isothiocyanate | Methyl iodide | 6-chloro-3-methyl-2-methylthio-4(3H)-quinazolinone. |
| 5-fluoroanthranilic acid | Dodecyl isothiocyanate | Hexyl iodide | 6-fluoro-3-doecyl-2-hexylthio-4(3H)-quinazolinone. |
| 5-iodoanthranilic acid | Allyl isothiocyanate | Dodecyl iodide | 6-iodo-3-allyl-2-dodecylthio-4(3H)-quinazolinone. |
| 5-bromoanthranilic acid | Octen-7-yl isothiocyanate | Allyl bromide | 6-bromo-3-(octen-7-yl)-2-2-allylthio-4(3H)-quinazolinone. |
| 5-methylanthranilic acid | Propynyl isothiocyanate | Octen-7-yl bromide | 6-methyl-3-propynyl-2-(octen-7-ylthio)-4(3H)-quinazolinone. |
| 5-ethylanthranilic acid | Octyn-7-yl isothiocyanate | Propargyl bromide | 6-ethyl-3-(octyn-7-yl)-2-propargylthio-4(3H)-quinazolinone. |
| 5-propylanthranilic acid | Cyclopropyl isothiocyanate | Octyn-7-yl bromide | 6-propyl-3-cyclopropyl-2-(octyn-7-ylthio)-4(3H)-quinazolinone. |
| 5-butylanthranilic acid | Cyclooctyl isothiocyanate | Cyclohexen-2-ylbromide | 6-butyl-3-cyclooctyl-2-(cyclohexen-2-ylthio)-4(3H)-quinazolinone. |
| 5-methoxyanthranilic acid | Cyclobutenyl isothiocyanate | Cyclopropyl bromide | 6-methoxy-3-cyclobutenyl-2-cyclopropylthio-4(3H)-quinazolinone. |
| 5-ethoxyanthranilic acid | Cyclooocten-2-yl isothiocyanate | Cyclooctyl bromide | 6-ethoxy-3-(cycloocten-2-yl)-2-cyclooctylthio-4(3H)-quinazolinone. |
| 5-propoxyanthranilic acid | Cyclopropylmethyl isothiocyanate | Cyclohexyl bromide | 6-propoxy-3-cyclopropylmethyl-2-cyclohexylthio-4(3H)-quinazolinone. |
| 5-butoxyanthranilic acid | Cyclohexylpropyl isothiocyanate | Benzyl bromide | 6-butoxy-3-cyclohexylpropyl-2-benzylthio-4(3H)-quinazolinone. |
| 3-chloroanthranilic acid | Isopropyl isothiocyanate | Methyl iodide | 8-chloro-3-isopropyl-2-methylthio-4(3H)-quinazolinone. |

TABLE—Continued

| Anthranilic acid | Isothiocyanate | Alkyl halide | Quinazolinones |
|---|---|---|---|
| 3-fluoroanthranilic acid | 2-chloroethyl isothiocyanate | Ethyl iodide | 8-fluoro-3-(2-chloroethyl)-2-ethylthio-4(3H)-quinazolinone. |
| 3-iodoanthranilic acid | 2-methoxypropyl isothiocyanate | Propyl iodide | 8-iodo-3-(2-methoxypropyl)-2-propylthio-4(3H)-quinazolinone. |
| 3-bromoanthranilic acid | Hexyl isothiocyanate | Butyl iodide | 8-bromo-3-hexyl-2-butylthio-4(3H)-quinazolinone. |
| 3-methylanthranilic acid | Cyclohexyl isothiocyanate | Hexyl iodide | 8-methyl-3-cyclohexyl-2-hexylthio-4(3H)-quinazolinone. |
| 3-ethylanthranilic acid | 2-hydroxyethyl isothiocyanate | Methyl iodide | 8-ethyl-3-(2-hydroxyethyl)-2-methylthio-4(3H)-quinazolinone. |
| 3-propylanthranilic acid | 2-cyanoethyl isothiocyanate | do | 8-propyl-3-(2-cyanoethyl)-2-methylthio-4(3H)-quinazolinone. |
| 3-butylanthranilic acid | Carbethoxymethyl isothiocyanate | do | 8-butyl-3-carbethoxymethyl-2-methylthio-4(3H)-quinazolinone. |
| 3-methoxyanthranilic acid | Carboxymethyl isothiocyanate | Allyl bromide | 8-methoxy-3-carboxymethyl-2-allylthio-4(3H)-quinazolinone. |
| 3-ethoxyanthranilic acid | 4-methylpenten-2-yl isothiocyanate | Cyclohexyl bromide | 8-ethoxy-3-(4-methylpenten-2-yl)-2-cyclohexylthio-4(3H) quinazolinone. |
| 3-propoxyanthranilic acid | 4-hydroxyhexen-2-yl isothiocyanate | Benzyl bromide | 8-propoxy-3-(4-hydroxyhexen-2-yl)-2-benzylthio-4(3H)-quinazolinone. |
| 3-butoxyanthranilic acid | 2-bromobuten-3-yl isothiocyanate | Allyl bromide | 8-butoxy-3-(2-bromobuten-3-yl)-2-allylthio-4(3H)-quinazolinone. |
| 3,5-dibromoanthranilic acid | 2-ethoxybuten-3-yl isothiocyanate | do | 6,8-dibromo-3-(2-ethoxybuten-3-yl)-2-allylthio-4(3H)-quinazolinone. |
| 3-bromo-5-methylanthranilic acid. | 1-cyanopropenyl isothiocyanate | do | 6-methyl-8-bromo-3-(1-cyanopropenyl)-2-allylthio-4(3H)-quinazolinone. |
| 3-ethoxy-5-chloroanthranilic acid. | 1-carbethoxypropenyl isothiocyanate | do | 6-chloro-8-ethoxy-3-(1-carbethoxypropenyl)-2-allylthio-4(3H)-quinazolinone. |
| 3,5-dimethylanthranilic acid | 2-carboxybuten-3-yl isothiocyanate | Benzyl bromide | 6,8-dimethyl-3-(2-carboxybuten-3-yl)-2-benzylthio-4(3H)-quinazolinone. |
| 3-methoxy-5-ethylanthranilic acid. | 4-methylpentyn-2-yl isothiocyanate | do | 6-ethyl-8-methoxy-3-(4-methylpentyn-2-yl)-2-benzylthio-4(3H)-quinazolinone. |
| 5-chloroanthranilic acid | 4-hydroxyhexen-2-yl isothiocyanate | do | 6-chloro-3-(4-hydroxyhexen-2-yl-2-benzylthio(3H)-quinazolinone. |
| 5-bromoanthranilic acid | 2-bromobutyn-3-yl isothiocyanate | Methyl iodide | 6-bromo-3-(2-bromobutyn-3-yl)-2-methylthio-4(3H)-quinazolinone. |
| 3-methylanthranilic acid | 2-ethoxybutyn-3-yl isothiocyanate | do | 8-methyl-3-(2-ethoxybutyn-3-yl)-2-methylthio-4(3H)-quinazolinone. |
| 5-methylanthranilic acid | 4-cayanopentyn-2-yl isothiocyanate | do | 6-methyl-3-(4-cyanopentyn-2-yl)-2-methylthio-4(3H)-quinazolinone. |
| 3-chloroanthranilic acid | 4-carbethoxypentyn-2-yl isothiocyanate | do | 8-chloro-3-(4-carbethoxypentyn-2-yl)-2-methylthio-4(3H)-quinazolinone. |
| 5-iodoanthranilic acid | 2-carboxybutyn-3-yl isothiocyanate | do | 6-iodo-3-(2-carboxybutyn-3-yl)-2-methylthio-4(3H)-quinazolinone. |
| 5-bromoanthranilic acid | 2-chlorocyclopropyl isothiocyanate | do | 6-bromo-3-(2-chlorocyclopropyl)-2-methylthio-4(3H)-quinazolinone. |
| 5-chloroanthranilic acid | 3-methylcyclohexyl isothiocyanate | do | 6-chloro-3-(3-methylcyclohexyl)-2-methylthio-4(3H)-quinazolinone. |
| 5-methylanthranilic acid | 2-cyanocyclopentyl isothiocyanate | do | 6-methyl-3-(2-cyanocyclopentyl)-2-methylthio-4(3H)-quinazolinone. |
| 5-methoxyanthranilic acid | 4-methoxycyclohexyl isothiocyanate | Ethyl iodide | 6-methoxy-3-(4-methoxycyclohexyl)-2-ethylthio-4(3H)-quinazolinone. |
| 5-ethoxyanthranilic acid | 4-hydroxycyclohexyl isothiocyanate | do | 6-ethoxy-3-(4-hydroxycyclohexyl)-2-ethylthio-4(3H)-quinazolinone. |
| 5-chloroanthranilic acid | 2-carboxycyclopentyl isothiocyanate | do | 6-chloro-3-(2-carboxycyclopentyl)-2-ethylthio-4(3H)-quinazolinone. |
| 5-chloroanthranilic acid | 2-carbomethoxycyclopentyl isothiocyanate | do | 6-chloro-3-(2-carbomethoxycyclopentyl)-2-ethylthio-4(3H)-quinazolinone. |
| 5-methylanthranilic acid | 2-chlorocyclohexen-2-yl isothiocyanate | do | 6-methyl-3-(2-chlorocyclohexen-2-yl)-2-ethylthio-4(3H)-quinazolinone. |
| 3-methylanthranilic acid | 2-methylcyclohexen-2-yl isothiocyanate | do | 8-methyl-3-(2-methylcyclohexen-2-yl)-2-ethylthio-4(3H)-quinazolinone. |
| 3-methylanthranilic acid | 3-cyanocyclobuten-2-yl isothiocyanate | do | 8-methyl-3-(3-cyanocyclobuten-2-yl)-2-ethylthio-4(3H)-quinazolinone. |
| 5-chloroanthranilic acid | 4-hydroxycyclohexen-2-yl isothiocyanate | do | 6-chloro-3-(4-hydroxycyclohexen-2-yl)-2-ethylthio-4(3H)-quinazolinone. |
| 5-fluoroanthranilic acid | 4-ethoxycyclohexen-2-yl isothiocyanate | do | 6-fluoro-3-(4-ethoxycyclohexen-2-yl)-2-ethylthio-4(3H)-quinazolinone. |
| 5-iodoanthranilic acid | 2-carboxycyclohepten-3-yl isothiocyanate | do | 6-iodo-3-(2-carboxycyclohepten-3-yl)-2-ethylthio-4(3H)-quinazolinone. |
| 3-ethoxyanthranilic acid | 2-carbethoxycyclobuten-2-yl isothiocyanate | Allyl bromide | 8-ethoxy-3-(2-carbethoxycyclobuten-2-yl)-2-allylthio-4(3H)-quinazolinone. |
| 3-chloroanthranilic acid | 2-chlorocyclopropyl-methyl isothiocyanate | do | 8-chloro-3-(2-chlorocyclopropylmethyl)-2-allylthio-4(3H)-quinazolinone. |
| 3-propoxyanthranilic acid | 3-methylcyclohexyl-methyl isothiocyanate | do | 8-propoxy-3-(3-methylcyclohexylmethyl)-2-allylthio-4(3H)-quinazolinone. |
| 5-iodoanthranilic acid | 2-cyanocyclopentylethyl isothiocyanate | do | 6-iodo-3-(2-cyanocyclopentylethyl)-2-allylthio-4(3H)-quinazolinone. |
| 5-bromoanthranilic acid | 4-methoxycyclohexylethyl isothiocyanate | do | 6-bromo-3-(4-methoxycyclohexylethyl)-2-allylthio-4(3H)-quinazolinone. |
| 5-propoxyanthranilic acid | 4-hydroxycyclohexylmethyl isothiocyanate | do | 6-propoxy-3-(4-hydroxycyclohexylmethyl)-2-allylthio-4(3H)-quinazolinone. |
| 5-butoxyanthranilic acid | 2-carboxycyclopentylmethyl isothiocyanate | do | 6-butoxy-3-(2-carboxycyclopentylmethyl)-2-allylthio-4(3H)-quinazolinone. |
| 5-chloroanthranilic acid | 2-carbomethoxycyclohexylmethyl isothiocyanate | do | 6-chloro-3-(2-carbomethoxycyclohexylmethyl)-2-allylthio-4(3H)-quinazolinone. |
| 5-chloroanthranilic acid | Butyl isothiocyanate | Chloroacetonitrile | 6-chloro-3-butyl-2-cyanomethylthio-4(3H)-quinazolinone. |
| 5-chloroanthranilic acid | Methyl isothiocyanate | Chloromethyl methyl ether. | 6-chloro-3-methyl-2-methoxymethylthio-4(3H)-quinazolinone. |

Example 8.—Preparation of 6-chloro-3-ethyl-2-methylthio-4(3H)-quinazolinethione

Four parts of phosphorous pentasulfide is added to a stirred solution of 2 parts of 6-chloro-3-ethyl-2-methylthio-4(3H)-quinazolinone (from Example 1) in 11 parts of dioxane. The suspension is stirred for 12 hours and then the solvent is evaporated to dryness under reduced pressure. The resulting solid, 6-chloro-3-ehtyl-2-methylthio-4(3H)-quinazolinethione, is purified by recrystallizing from ethanol.

The quinazolinethiones listed in the following table can be prepared in a similar fashion by substituting equivalent amounts of suitably substituted quinazolinones for 6-chloro-3-ethyl-2-methylthio-4(3H)-quinazolinone:

6-methyl-3-allyl-2-hexylthio-4(3H)-quinazolinethione
8-methyl-3-propyl-2-methoxy-4(3H)-quinazolinethione
6-ethoxy-3-cyclohexyl-2-methylthio-4(3H)-quinazolinethione
8-propyl-3-propynyl-2-cyclohexylthio-4(3H)-quinazolinethione 6-bromo-3-methyl-2-allylthio-4(3H)-quinazolinethione
6-chloro-3-dodecyl-2-methoxy-4(3H)-quinazolinethione
6,8-dibromo-3-methyl-2-benzylthio-4(3H)-quinazolinethione
6-chloro-3-cyclohexyl-2-allyloxy-4(3H)-quinazolinethione
8-ethyl-3-cyclopentyl-2-ethylthio-4(3H)-quinazolinethione
8-ethyl-3-cyclopentyl-2-ethylthio-4(3H)-quinazolinethione
6-methoxy-3-methyl-2-butylthio-4(3H)-quinazolinethione
8-fluoro-3-allyl-2-benzoxy-4(3H)-quinazolinethione Example 9.—Preparation of 6-chloro-3-methyl-2-ethoxy-4(3H)-quinazolinone Eleven parts of 6-chloro-3-methyl-2-thio-4(3H)-quinazolinedione (prepared as in Example 1) is suspended in 140 parts of 10% ethanolic sodium hydroxide. Fifteen parts of methyl iodide is added and the suspension is stirred overnight at room temperature. Two hundred parts of water is added, whereupon a white solid separates. This solid is collected by filtration and recrystallized from a mixture of ethanol and water to give five parts of pure 6 - chloro - 3-methyl-2-ethoxy-4(3H)-quinazolinone, melting at 112.5–115° C.

Example 10.—Preparation of 6-chloro-3-ethyl-2-methoxy-4(3H)-quinazolinone

Eight parts of 6-chloro-3-ethyl-2-methylthio-4(3H)-quinazolinone is added to a solution of 4 parts of sodium methoxide in 40 parts of methanol. The solution is stirred and refluxed for 16 hours and then evaporated to dryness under reduced pressure. The residue is diluted with 75 parts of water and the resulting white solid is removed by filtration and washed with water. This compound is then recrystallized from a mixture of ethanol and water to give three parts of 6-chloro 3-ethyl-2-methoxy-4(3H)-quinazolinone, melting at 108–109° C.

The quinazolinones listed in the following table can be prepared in a similar manner by substituting equivalent amounts of suitably substituted quinazolinones for 6-chloro-3-ethyl-2-methylthio-4(3H)-quinazolinone:

6-bromo-3-methyl-2-methoxy-4(3H)-quinazolinone
6,8-dichloro-3-allyl-2-alloxy-4(3H)-quinazolinone
6-methyl-3-cyclohexyl-2-benzoxy-4(3H)-quinazolinone
6-methoxy-3-allyl-2-cyclohexoxy-4(3H)-quinazolinone
6-butoxy-3-hexyl-2-methoxy-4(3H)-quinazolinone
8-propyl-3-propynyl-2-ethoxy-4(3H)-quinazolinone
8-chloro-3-dodecyl-2-alloxy-4(3H)-quinazolinone
8-ethoxy-3-ethyl-2-propynoxy-4(3H)-quinazolinone
8-fluoro-3-cyclohexyl-2-cyclopentoxy-4(3H)-quinazolinone Example 11.—Preparation of 6-iodo-3-allyl-2-methylthio-4(3H)-quinazolinone Thirteen parts of 5-iodo anthranilic acid is added to a stirred solution of five parts of allyl isothiocyanate in 70 parts of ethanol. The suspension is refluxed for six hours and the precipitated 2-thioquinazolinedione filtered and dried. Six parts of essentially pure 6-iodo-3-allyl-2-thio-4(3H)-quinazolinedione is obtained. This compound is then combined with five parts of methyl iodide and 60 parts of 5% alcoholic:aqueous (60:40) sodium hydroxide and stirred for one hour at room temperature, whereupon a white solid separates. This solid is filtered to give four parts of crude 6-iodo-3-allyl-2-methylthio-4(3H)-quinazolinone, melting at 126–130° C. Recrystallization from ethanol gives three parts of pure 6-iodo-3-allyl-2-methylthio-4(3H)-quinazolinone, melting point 129–130° C.

The quinazolinones listed in the following table can be prepared in the same manner by substituting the appropriate amount of the substituted 6-iodo-2-thioquinazolinedione and the alkyl halide:

6-iodo-3-methyl-2-methylthio-4(3H)-quinazolinone
6-iodo-3-methyl-2-ethylthio-4(3H)-quinazolinone
6-iodo-3-methyl-2-allylthio-4(3H)-quinazolinone
6-iodo-3-methyl-2-n-propylthio-4(3H)-quinazolinone
6-iodo-3-methyl-2-carboethoxymethylthio-4(3H)-quinazolinone
6-iodo-3-ethyl-2-methylthio-4(3H)-quinazolinone
6-iodo-3-ethyl-2-ethylthio-4(3H)-quinazolinone
6-iodo-3-ethyl-2-allylthio-4(3H)-quinazolinone
6-iodo-3-ethyl-2-isopropylthio-4(3H)-quinazolinone
6-iodo-3-allyl-2-methylthio-4(3H)-quinazolinone
6-iodo-3-allyl-2-ethylthio-4(3H)-quinazolinone
6-iodo-3-allyl-2-allylthio-4(3H)-quinazolinone Example 12.—Preparation of 6-bromo-3-allyl-2-methylthio-4(3H)-quinazolinone Eleven parts of 5-bromoanthranilic acid are added to a stirred solution of five parts of allyl isothiocyanate in 70 parts of ethanol. The suspension is refluxed for six hours and the precipitated 2-thioquinazolinedione filtered. The compound is recrystallized from ethanol to give five parts of 6-bromo-3-allyl-2-thio-4(3H)-quinazolinedione.

This compound is then combined with three-fourths part of sodium hydride in 80 parts of tetrahydrofuran and stirred at room temperature for one hour. Three parts of methyl iodide is added and stirred at room temperature for four hours. The solvent is then evaporated under reduced pressure. The residue is treated with water, filtered and air dried. This compound is recrystallized from ethanol to give three parts of 6-bromo-3-allyl-2-methylthio-4(3H)-quinazolinone, melting point 115–117° C.

The quinazolinones listed in the following table can be prepared in the same manner by substituting equivalent amounts of suitably substituted quinazolinones for 6-bromo-3-allyl-2-thio-4(3H)-quinazolinedione and the required quantity of alkyl halide:

6-bromo-3-methyl-2-methylthio-4(3H)-quinazolinone
6-bromo-3-methyl-2-ethylthio-4(3H)-quinazolinone
6-bromo-3-methyl-2-allylthio-4(3H)-quinazolinone
6-bromo-3-methyl-2-isopropylthio-4(3H)-quinazolinone
6-bromo-3-methyl-2-propargylthio-4(3H)-quinazolinone
6-bromo-3-ethyl-2-methylthio-4(3H)-quinazolinone
6-bromo-3-ethyl-2-ethylthio-4(3H)-quinazolinone
6-bromo-3-allyl-2-methylthio-4(3H)-quinazolinone
6-bromo-3-allyl-2-ethylthio-4(3H)-quinazolinone
6-bromo-3-allyl-2-allylthio-4(3H)-quinazolinone Example 13—Preparation of 6-bromo-3-allyl-2-cyanomethylthio-4(3H)-quinazolinones Four parts of 6-bromo-3-allyl-2-thio-4(3H)quinazolinedione is combined with 70 parts of a 5% ethanolic: aqueous (60:40) sodium hydroxide solution and stirred at room temperature for 15 minutes. Two parts of chloroacetonitrile is added and the mixture stirred at room temperature for one hour, whereupon a white solid separates. This solid is filtered to give three parts of crude material melting at 155–160° C. This solid is recrystallized from ethanol to give the 6-bromo-3-allyl-2-cyanomethylthio-4(3H)-quinazolinone, metling point 159–162° C.

Example 14—Preparation of 6-chloro-3-allyl-2-methoxymethylthio-4(3H)-quinazolinone Seven parts of 6-chloro-3-allyl-2-thio-4(3H)-quinazolinedione was combined with one and one-half parts of 50% oil dispersion of sodium hydride in 75 parts of tetrahydrofuran. This solution is stirred at room temperature for one hour and then two and one-half parts of chloromethyl methyl ether is added. This solution is stirred at room temperature for three hours, filtered, and the solvent evaporated under a vacuum. The residue is treated with hexane and the solid filtered to give seven parts of crude quinazolinone, melting point 56–61° C. Recrystallization of this solid from cyclohexane gives five parts of 6-chloro-3-allyl-2-methoxymethylthio-4(3H)-quinazolinone, melting point 62.5–64° C.

The corresponding 2-methylthio methylthio quinazolinone is prepared in the same manner by substituting the required quantity of chloromethyl methyl sulfide and the appropriate 2-thioquinazolinedione.

As mentioned previously, it has been found that the compounds of Formula I possess outstanding fungicidal activity when employed to prevent or mitigate damage to plants by fungi. The compounds are particularly effective against cucumber powdery mildew fungi.

The compounds of this invention control a wide variety of powdery mildew fungus diseases of foliage, fruit and stems of growing plants without damage to the host.

The many fungi against which the compounds of this invention are active may be represented by, but is not intended to be limited to, the following: *Podosphaera leucotricha*, which incites powdery mildew on apple and attacks other members of the rose family; *Erysiphe cichoracearum* or *Sphaerotheca fuliginea* which incite powdery mildew on cantaloupe and other cucurbit crops; *Erysiphe graminis*, which incites powdery mildew on cereals and grasses; *Erysiphe polygoni*, which incites powdery mildew on clovers, peas, beans, alfalfa and some 200 other plant species; *Sphaerotheca humuli* and *S. pannosa*, which incites powdery mildew on roses and other ornamentals; *Sphaerotheca mors-uvae*, which incites powdery mildew on gooseberries and currants; *Uncinula necator*, which incites powdery mildew on grapes.

The compounds of this invention provide protection from damage caused by powdery mildew fungi when applied to the proper locus by the methods described hereinafter and at a sufficient rate to exert the desired fungicidal effect. They are especially suited for the protection of living plants such as fruit bearing trees, vegetable crops, horticultural crops (including ornamentals, small fruits and berries), fiber crops, grain and seed crops, sugar beets, forage and hay crops, beans, peas, soybeans, turf and pasture.

Living plants may be protected from fungi by applying one or more of the compounds of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solution. Preferred rates for application of the compounds of this invention to soil in which plants are or will be growing range from 0.01 to 500 parts per million by weight of the soil in which the roots are or will be growing. More preferred use rates are in the range of 0.1 to 50 parts per million, and the most preferred rates are in the range of 0.25 to 25 parts per million.

Preferred rates for application to seeds, tubers, bulbs or other plant reproductive parts, range from 0.03 to 6000 grams of active compound of this invention per 50 kilograms of planting material treated. More preferred rates are in the range of 0.3 to 3000 grams of active compound per 50 kilograms. The most preferred rates are in the range of 2.8 to 1500 grams per 50 kilograms. Applications are made from dusts, slurries or solutions.

Preferred rates for application of the compounds of this invention to foliage, stems and fruit of living plants range from 0.012 to 60 kilograms of active ingredient per hectare. More preferred rates are in the range of 0.025 to 30 kilograms per hectare and the most preferred rates are in the range of 0.05 to 15 kilograms per hectare. The optimum amount within this range depends upon a number of variable which are well known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days. Applications are made from dusts, slurries or solutions.

Preferred rates for dip applications to roots of living plants are in the range of 0.5 to 18,000 grams of active ingredient per 380 liters of water or othr liquid carrier. More preferred rates are in the range of 4.5 to 9,000 grams per 380 liters and the most preferred rates are in the range of 45 to 4500 grams per 380 liters.

Preferred rates for injection into the roots or stems of living plants are in the range of 0.01 to 10,000 parts per million of water or other liquid carrier. More preferred rates are in the range of 0.1 to 5,000 parts per million. The most preferred rates are in the range of 1 to 1,000 parts per million.

The compounds of this invention will be applied in a variety of formulations, including wettable powders, dusts, suspensions, emulsifiable concentrates, solutions, granules, pellets, etc. High strength compositions may also be prepared for use by formulators in further processing near the point of use. These formulations will include one or more compounds of Formula I and can include surface-active agents, solid or liquid diluents and other materials as required to produce the desired formulation.

The surface-active agents act as wetting, dispersing and emulsifying agents which assist dispersion of the active material in the spray, and improve wetting of waxy foliage and the like by the spray. The surfactants can include such anionic, non-ionic and cationic agents as have been used heretofore in pesticidal compositions of similar type. A detailed list of such agents may be found in "Detergents and Emulsifiers Annual," (John W. McCutcheon, Inc.).

Anionic and non-ionic surfactants are preferred. Among the anionic surfactants, preferred ones are alkali and alkaline earth salts of alkylarylsulfonic acids, such as dodecylbenzenesulfonates and alkylnaphthalenesulfonates, dialkyl sodium sulfosuccinate esters, sodium lauryl sulfate, sodium N-methyl-N-oleyltaurate, sodium dodecyldiphenyl ether disulfonate, partial phosphate esters of alkyl and alkylphenyl polyethyleneoxyethanols, and the oleic acid ester of sodium isothionate. Among the non-ionic surfactants, preferred ones include alkylphenyl polyethylene glycol ethers, polyoxyethylene derivatives of sorbitan fatty esters and long-chain alcohols and mercaptans, as well as polyoxyethylene esters of fatty acids.

Preferred dispersants are alkali and alkaline earth salts of lignosulfonic acids, salts of polymerized alkylarylsulfonates such as are sold under the "Daxad" and "Darvan" trademarks, as well as methylcellulose, polyvinyl alcohol and the like.

Surfactants are present in compositions of this invention in amounts up to about 20% by weight based on the total weight of the resulting composition. When larger amounts of surfactant are desired, as for improved wetting of, spreading on, or penetration into foliage, mixing in the spray tank is usually preferable for convenience.

Powder and dust preparations can be made by blending the active ingredient, with or without surfactant, with finely divided solids such as talcs, natural clays, pyrophyllite, diatomaceous earth; flours such as walnut shell, wheat, redwood, soya bean and cotton seed; or inorganic substances such as magnesium carbonate, calcium carbonate, calcium phosphate, sodium silicoaluminate, sulfur and the like. The choice of a particular diluent is based on consideration of the physical and chemical properties required of the product, the chemical and physical properties and concentration of the active ingredient, and the use for which the formulation is intended. The compositions are made by thoroughly blending the active ingredient with the diluent and other additives. Usually a grinding step, as in a hammer mill or fluid energy mill, is included. The particles in dust and powder preparations are preferably less than 50 microns in average diameter. With compounds which are highly water insoluble, improved activity may be obtained with still finer grinding.

Preferred wettable powder formulations will contain 40% or more active ingredient together with sufficient surfactant and inert diluent to permit dispersion in water for spray application. Compositions intended for dust application will generally contain less than 50% active ingredient.

Powdered compositions can be converted to granules by adding a liquid, treating mechanically, and usually, drying. Mechanical devices such as granulating pans, mixers and extruders can be used. Compaction devices can be used even without a liquid in the mixture. Water soluble binders, such as inorganic salts, urea, ligninsulfonates, methyl cellulose, other water soluble polymers, and the like, can be included in these particulate formulations in amounts up to about 25% by weight of the finished granule or pellet. Such materials also aid in disintegration of the pellet and release of the active ingredient under field conditions. Alternatively, a melt, solution or suspension of the active ingredient can be sprayed on the surface of preformed granules of clay, vermiculite, corn cob and the like. Surfactants may also be included in formulations of the latter type.

Solution formulations can be prepared in organic solvents. All solution formulations can be used for direct low-volume applications. For such use, all that is required is practical solubility and stability of the active ingredient in the chosen solvent. An important sub-class of solution formulations is emulsifiable concentrates. For these, a water-immersible solvent is required as well as surfactant to help form and stabilize the final aqueous emulsion in which the fungicide is applied. It is preferred that the active ingredient in solution formulations remain totally dissolved at 0° C. or as low a storage temperature as can reasonably be expected to occur for prolonged periods. In order to insure this, co-solvents, which may be water-miscible, may also be included in the formulations.

Suspension formulations can be made in water, or in organic solvents, or in mixtures of water and water-miscible organic solvents in which the active ingredient has a solubility under about 0.1%. The preparations usually include, in addition to the active ingredient and liquid carrier, surfactants, viscosity control agents, anti-microbial agents and other moidfiers. They are prepared by grinding the components in a sand mill, roller mill or pebble mill preferably until the average particle size is under 20 microns. It is entirely practical, and in some instances biologically advantageous, to grind until a major proportion of active ingredient is 2 microns in diameter or smaller. Hydrocarbon and other flammable carriers should have boiling points above about 125° C. for safety in handling. Suspensions in hydrocarbons are suitable for extension in spray oils and, by inclusion of a suitable emulsifying agent, may also be made sprayable from water.

Organic liquids suitable for preparation of solutions, suspensions and emulsifiable concentrates of the compounds of this invention include alcohols, glycols, Cellosolves, carbitols, ethers, ketones, esters, sulfamides, amides, sulfoxides, sulfones, paraffinic hydrocarbons, aromatic hydrocarbons and halogenated hydrocarbons. Choice of a liquid is dictated by the solubility of the active compound to be used and whether a suspension or solution is desired. The class of compounds represented by Formula I is variable in solubility characteristics, so it is not possible to generalize in the use of particular solvents for particular purposes.

All compositions intended for spray use can contain minor amounts of additives to reduce foam, inhibit corrosion, prevent claying, reduce caking, etc. as the conditions of use may dictate. The conditions of need for and use of such additives are generally known in the art.

The compositions of the invention can contain, in addition to the active ingredient of this invention, conventional insecticides, miticides, bactericides, nematicides, fungicides, or other agricultural chemicals such as fruit set agents, fruit thinning compounds, fertilizer ingredients and the like, so that the compositions can serve useful purposes in addition to the control of fungi and mite infestations.

The following are illustrative of the agricultural chemicals that can be included in the compositions or, additionally, that may be added to sprays containing one or more of the active compounds.

The additional agricultural chemicals are employed in mixtures or combinations in amounts ranging from one-fifth to twenty times that of the compound or compounds of this invention. The proper choice of amounts is readily made by one skilled in the art of protecting plants from pest depredations.

1,2,3,4,10,10-hexachloro-6,7-epoxy-1,4,4a,5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1,1,1-trichloro-2,2-bis(p-methoxyphenyl)ethane (methoxychlor);
1,1-dichloro-2,2-bis(p-chlorophenyl)ethane;
2-nitro-1,1-bis(p-chlorophenyl)butane;
1-naphthyl-N-methylcarbamate (carbaryl);
methylcarbamic acid, ester with phenol, 4-(dimethylamino)-3,5-dimethyl;
methylcarbamic acid, ester with 1,3-dithiolan-2-one oxime;
O,O-dimethyl 1-hydroxy-2,2,2-trichloroethyl phosphonate (diazinon);
O,O-dimethyl S-(1,2-dicarbethoxyethyl)dithiophosphate (malathion);
O,O-diethyl O-p-nitrophenyl thiophosphate (parathion);
O,O-dimethyl O-(2,2-dichlorovinyl) phosphate (dichlorvos);
O,O-dimethyl S-(4-oxo-1,2,3-benzotriazine-3(4H)-ylmethyl) phosphorodithioate (azinphosmethyl);
dibasic lead arsenate;
2'-chloroethyl 1-methyl-2-(p-tert-butylphenoxy)ethyl sulfite;
azobenzene;
ethyl 2-hydroxy-2,2-bis(4-chlorophenyl)acetate;
O,O-diethyl O-[2-(ethylmercapto)ethyl] thiophosphate Systox® demeton);
2,4-dinitro-6-sec-butylphenol;
toxaphene;
O-ethyl O-p-nitrophenyl benzenethiophosphonate (EPN);
tetraethyl pyrophosphate (TEPP);
1,1-bis-(p-chlorophenyl)2,2,2-trichloroethanol (dicofol);
ethyl-2-hydroxy-2,2-bis(4-chlorophenyl)acetate (chlorobenzilate);
methyl O-carbamylthiolactohydroxamate;
methyl O-(methylcarbamyl)thiolacetohydroxamate (methomyl);
5-methyl 1-dimethylcarbamoyl-N-[(methylcarbamoyl)oxy]thioformimidate;
p-dimethylaminobenzenediazo sodium sulfonate;
2-heptadecylimidazoline acetate (glyodin);
quinone oxyaminobenzooxohydrazone;
tetralkylthiuram disulfides such as tetramethylthiuram disulfide or tetraethyl thiuram disulfide;
metal salts of ethylenebisdithiocarbamic acid or propylene-bisdithiocarbamic acids, e.g. manganese, zinc, iron and sodium salts (maneb, zineb, nabam, etc.);
pentachloronitrobenzene;

2-(1-methylheptyl)-4,6-dinitrophenyl crotonate and other nitrophenol derivatives;
n-dodecylguanidine acetate (dodine);
N-(trichloromethylthio)phthalimide;
N-trichloromethylthiotetrahydrophthalimide (captan);
cis-N-[(1,1,2,2-tetrachloroethyl)thio]-4-cyclohexene-1,2-dicarboximide;
2,4-dichloro-6-(o-chloroaniline)-s-triazine ("Dyrene®");
3,3'-ethylenebis(tetrahydro-4,6-dimethyl-2H-1,3,5-thiadiazine-2-thione);
triphenyltin hydroxide;
1,4-dichloro-2,5-dimethoxybenzene;
triphenyltin acetate;
metal (e.g. iron, sodium and zinc), ammonium and amine salts of dialkyldithiocarbamic acids;
2,6-dichloro-4-nitroanaline;
tetrachloronitronanisole;
hexachlorobenzene;
hexachlorophene;
tetrachloroquinone;
2,3-dichloro-1,4-naphthoquinone;
cupric hydroxide;
tribasic copper sulfate;
fixed copper;
sulfur;
sodium monomethyldithiocarbamate (SMDC);
methyl-1-(butylcarbamoyl)-2-benzimidazole carbamate (benomyl);
dimethyl-2-carboxyamino-1-benzimidazolecarboxylate);
methyl-2-benzimidazolecarbamate;
2,3-dihydro-5-carboxanilide-6-methyl-1,4-oxathiin-4,4-dioxide;
Streptomycin Kasugamycin or other antibiotics;
2-(2,4,5-trichlorophenoxy)propionic acid;
p-chlorophenoxyacetic acid;
1-naphthaleneacetamide; and
N-(1-naphthyl)acetamide.

The agricultural chemicals listed above are merely exemplary of the compounds which can be mixed with the active compounds and are not intended to any way limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

The following examples are given to further illustrate methods of application and formulations of this invention. Percentages are by weight.

Example 15

Wettable powder: Percent
6-chloro-3-ethyl-2-methylthio - 4 - (3H) - quinazolinone _____ 40
Dioctyl sodium sulfosuccinate _____ 1.5
Sodium ligninsulfonate _____ 3
Low viscosity methyl cellulose _____ 1.5
Diatomite _____ 54

The ingredients are thoroughly blended, passed through an air mill, to produce an average particle size under 15 microns, reblended, and sifted through a U.S.S. No. 50 sieve (0.3 mm. opening) before packaging.

All compounds of the invention may be formulated in the same manner.

The outstanding control of powdery mildew by compounds of this invention is illustrated by a test in which the above formulation is applied to cucumber seedlings in a greenhouse preventive test. The seedlings are sprayed to run-off with a water suspension of the above formulation in which the active ingredient is at a concentration of 80 p.p.m. The treated seedlings are dried overnight. The following day the treated seedlings are inoculated with conidia of the fungus Erysiphe cichroacearum and allowed to incubate in the greenhouse. After 10 days the treated plants are green and healthy. Other seedlings that are not treated with the above formulation are covered with powdery mildew.

Any one of the following compounds may be substituted for the 6 - chloro-3 - ethyl - 2 - methylthio - 4(3H)-quinazolinone of Example 15 to achieve powdery mildew control:

6-chloro-3-allyl-21propylthio-4(3H)-quinazolinone
6-chloro-3-ethyl-2-methoxy-4(3H)-quinazolinone
6-methyl-3-ethyl-2-allylthio-4(3H)-quinazolinone
6-chloro-3-ethyl-2-ethoxy-4(3H)-quinazolinone
6-chloro-3-allyl-2-methylthio-4(3H)-quinazolinone
6-bromo-3-allyl-2-propylthio-4(3H)-quinazolinone
6-iodo-3-ethyl-2-ethylthio-4(3H)-quinazolinone
6,8-dibromo-3-allyl-2-methylthio-4(3H)-quinazolinone
6-chloro-3-allyl-2-cyanomethylthio-4(3H)-quinazolinone
6-chloro-3-allyl-2-propargylthio-4(3H)-quinazolinone
6-iodo-3-allyl-2-ethylthio-4(3H)-quinazolinone
6,8-dibromo-3-methyl-2-ethoxy-4(3H)-quinazolinone
6-iodo-3-methyl-2-ethoxy-4(3H)-quinazolinone
6-bromo-3-allyl-2-methylthio-4(3H)-quinazolinone
6-iodo-3-allyl-2-methylthio-4(3H)-quinazolinone
8-methyl-3-propyl-2-methoxymethylthio-4(3H)-quinazolinone
6-fluoro-3-cyclohexyl-2-benzylthio-4(3H)-quinazolinone
6-iodo-3-dodecyl-2-(octen-2-ylthio)-4(3H)-quinazolinone
6-butyl-3-cyclopropylmethyl-2-propoxy-4(3H)-quinazolinone
8-chloro-3-isopropyl-2-cyclooctylthio-4(3H)-quinazolinone
6-butoxy-3-cyclobutenyl-2-methoxy-4(3H)-quinazolinone
6,8-dichloro-3-carboxymethyl-2-methylthiomethylthio-4-(3H)-quinazolinone
6-methoxy-3-(ethoxybuten-3-yl)-2-methylthio-4(3H)-quinazolinone Example 16

Wettable powder: Percent
6-chloro-3-methyl-2 - ethoxy - 4(3H) - quinazolinone _____ 75
Sodium alkylnaphthalenesulfonate _____ 2
Sodium ligninsulfonate _____ 2
Synthetic amorphous silica _____ 3
Attapulgite _____ 18

The ingredients are thoroughly blended, passed through a hammer mill to produce an average particle size under 40 microns, reblended and sifted through a U.S.S. No. 50 sieve (0.3 mm. openings) before packaging.

Alternate rows of a field planting of cucumbers are sprayed with water containing a suspension of the wettable powder of this formulation and an added amount of a polyhydric alcohol ester surface-active agent ("Trem" 014). The concentration of this chemical suspension is such as to give 600 p.p.m. of active compound, and 400 p.p.m. of the surfactant. The remaining rows are sprayed with an equal volume of water containing only the surfactant. The spray is applied at a volume of 1400 liters per hectare each week.

The entire field is naturally inoculated with spores of the powdery mildew fungus (Erysiphe cichroacearum). At harvest time the untreated rows are heavily damaged by powdery mildew and some of the plants are dying. The rows treated with the compound of this invention, however, are healthy, growing well and supporting a normal crop.

The quinazolinone listed in Example 16 can be replaced by any of the quinazolinones listed below:

6-propyl-3-(2-bromobuten-3-yl)-3-methylthio-4(3H)-quinazolinone
6,8-dimethyl-3-(2-chloroethyl)-2-cyanomethylthio-4-(3H)-quinazolinone 8-butoxy-3-propynyl-2-hexylthio-4(3H)-quinazolinone
8-fluoro-3-cyclopropyl-2-benzylthio-4(3H)-quinazolinone
6,8-dibromo-3-(2-methoxypropyl)-2-methylthio-4(3H)-quinazolinone
8-methoxy-3-(2-cyanoethyl)-2-methylthio-4(3H)1quinazolinone
8-butoxy-3-carbethoxymethyl-2-allylthio-4(3H)-quinazolinone
8-butyl-3-(2-ethoxybuten-3-yl)-2-ethoxy-4(3H)-quinazolinone
6-methoxy-3-(2-cyanocyclopentyl)-2-methylthio-4-(3H)-quinazolinone
6-fluoro-3-(2-chlorocyclohexen-2-yl)-2-ethylthio-4(3H)-quinazolinone
6-methyl-3-(2-carbomethoxycyclopentyl)-2-methoxy-4-(3H)-quinazolinone
8-fluoro-3-(4-methoxycyclohexyl)-2-methylthio-4(3H)-quinazolinone
8-iodo-3-(4-hydroxycyclohexen-2-yl)-2-ethylthio-4(3H)-quinazolinone Example 17

| High strength concentrate and dust: | Percent |
|---|---|
| 6-chloro-3-allyl-2-methylthio-4(3H)-quinazoline | 95.0 |
| Silica aerogel | 1.0 |
| Synthetic amorphous fine silica | 4.0 |

The ingredients are blended and ground in a hammer mill to produce a high strength concentrate essentially all passing U.S.S. No. 50 mesh. This material may then be shipped or formulated in a number of ways. For example, the following 25% dust can be prepared.

| High strength concentrate | 26.3 |
|---|---|
| Pyrophyllite | 73.7 |

The materials are thoroughly blended and packaged for use.

The formulation of this example may be used in the manner described in Example 16 except that the active ingredient is applied as a dust rather than a spray. The control of powdery mildew is outstanding.

The following quinazolinones can be formulated in the same fashion:

6,8-dimethyl-3-(1-cyanopropenyl)-2-propylthio-4(3H)-quinazolinone
6-chloro-3-(2-carboxybuten-3-yl)-2-allylthio-4(3H)-quinazolinone
6-iodo-3-(4-methylpentyn-2-yl-3-2-methoxy-4(3H)-quinazolinone
6-ethyl-3-(2-bromobutyn-3-yl)-2-methylthio-4(3H)-quinazolinone
6-methyl-3-3-methylcyclohexyl)-2-allylthio-4(3H)-quinazolinone
6,8-diiodo-3-(2-methylcyclohexen-2-yl)-2-methylthio-4(3H)-quinazolinone
6,8-difluoro-3-(2-cyanocyclopentyl)-2-methylthio-4(3H)-quinazolinone
8-bromo-3-(2-chlorocyclopropylmethyl)-2-mthoxy-4(3H)-quinazolinone
8-propyl-3-(2-carbethoxycyclobuten-2-yl)-2-methylthio-4(3H)-quinazolinone
8-butoxy-3-(3-methylcyclohexylmethyl)-2-allylthio-4(3H)-quinazolinone
8-ethoxy-3-(4-hydroxycyclohexylmethyl)-2-propoxymethylthio-4(3H)-quinazolinone
6-methoxy-3-(2-chloroethyl)-2-(2-cyanopropylthio)-4(3H)-quinazolinone Example 18

| Dust: | Percent |
|---|---|
| 8 - methyl-3-ethyl-2-methylthio - 4(3H) - quinazolinone | 10 |
| Attapulgite | 20 |
| Talc | 70 |

The active ingredient is blended with attapulgite and then passed through a hammer mill to produce particles of active substantially all below 200 microns. The ground concentrate is then blended with powdered talc until homogeneous.

This dust formulation is applied to individual vines of grapes in otherwise untreated rows in a vineyard. The applications are made at a rate of 20 kilograms per hectare at 14-day intervals for a period of three months during the growing season. At the end of the treatment period the treated vines are healthy, support a heavy crop of high quality fruit, and show evidence of excellent cane growth. The foliage and fruit of untreated vines are severely damaged by powdery mildew (*Uncinula necator*).

Any of the wettable powders of Examples 15–17 inclusive may be diluted with talc and applied in like manner with similar results.

Example 18

| Extruded pellet: | Percent |
|---|---|
| 6-chloro-3-allyl-2-allylthio-4(3H)-quinazolinone | 15 |
| Anhydrous sodium sulfate | 10 |
| Calcium/magnesium ligninsulfonate | 10 |
| Sodium alkylnaphthalenesulfonate | 1 |
| Calcium/magnesium bentonite | 32 |
| Kaolinite | 32 |

The ingredients are blended, hammer milled and then moistened with about 12% water. The mixture is extruded as ca. 3 mm. diameter cylinders and cut as extruded to produce approximately 3 x 3 mm. pellets. These may be used as such after drying, or the dried pellets may be crushed to pass a U.S.S. No. 20 sieve (0.84 mm. openings). The fraction held on a U.S.S. No. 40 sieve (0.42 mm. opening) may be packaged for use and the fines recycled.

The pellets of this formulation provide an effective means for controlling powdery mildew by soil treatment. This is demonstrated by a greenhouse test in which pellets prepared as described above are mixed with potting soil before cucumbers are planted. The mixture is such as to give a rate of 50 p.p.m. of active ingredient in soil.

When the cucumbers are 14 days old they, and some plants growing in untreated soil, are inoculated by dusting with powdery mildew conidia (*Erysiphe cichoracearum*). The spores settle uniformly on the foliage and disease develops within a week.

After eight days the untreated cucumbers are white with powdery mildew. Plants growing in soil treated with the compound of this invention are disease free and growing vigorously.

Example 20

| Aqueous suspension: | Percent |
|---|---|
| 6-chloro-3-propyl - 2 - ethylthio-4(3H)-quinazolinone | 25 |
| Hydrated attapulgite | 3 |
| Crude calcium/magnesium lignin sulfonate | 10 |
| Sodium dihydrogen phosphate | 0.5 |
| Water | 61.5 |

The ingredients are ground together in a ball or roller mill until the solid particles have been reduced to diameters under 5 microns.

The aqueous suspension of this example may be applied in a manner similar to the wettable powder of Example 15 with comparable results.

Example 21

| Oil suspension: | Percent |
|---|---|
| 6-methyl-3-ethyl-2-allylthio-4(3H)-quinazolinone | 35 |
| Polyoxyethylene sorbitol heptaoleate | 8 |
| Synthetic fine silica | 1 |
| Paraffinic hydrocarbon oil | 56 |

The slurry is sand-milled to produce a stable suspension of particles substantially all below 5 microns. The suspension may be extended in spray oil or emulsified in water.

The oil suspension of this example may be used in the manner illustrated in Example 15 with similar results.

Other active compounds suitable for formulation in a like manner are:

6-chloro-3-butyl-2-cyclopentoxy-4(3H)-quinazolinone
8-iodo-3-propynyl-2-methoxymethoxy-4(3H)-quinazolinone
6-ethoxy-3-ethyl-2-methylthiomethylthio-4(3H)-quinazolinone
6-propyl-3-cyclohexyl-2-alloxy-4(3H)-quinazolinone
6-bromo-3-(2-carboxycyclopentyl)-2-cyanomethylthio-4(3H)-quinazolinone
6,8-dibromo-3-butyl-2-propoxymethylthio-4(3H)-quinazolinone
6-methyl-3-allyl-2-butylthio-4(3H)-quinazolinethione
6-iodo-3-methyl-allyloxy-4(3H)-quinazolinethione
6-butoxy-3-cyclohexyl-2-ethylthio-4(3H)-quinazolinethione
6,8-dibromo-3-propynyl-2-methoxy-4(3H)-quinazolinethione
6-methyl-3-propyl-2-methylthio-4(3H)-quinazolinethione
8-iodo-3-ally-2-cyclohexoxy-4(3H)-quinazolinethione
8-butyl-3-dodecyl-2-cyanomethylthio-4(3H)-quinazolinethione
8-fluoro-3-cyclopentyl-2-methoxymethylthio-4(3H)-quinazolinethione
8-methyl-3-methyl-2-allylthio-4(3H)-quinazolinethione

EXAMPLE 22

Emulsifiable concentrate: Percent
  6-chloro-3-ethyl - 2 - hexylthio-4(3H)-quinazolinone _____ 25
  Xylene _____ 72
  Blend of oil soluble sulfonates and polyoxyethylene ethers _____ 3

The ingredients are combined and stirred with gentle warming to speed solution. A fine screen filter is included in the packaging line to insure the absence of any undissolved matter in the final product.

The emulsifiable concentrate of this example may be used in the manner illustrated in Example 15 with similar results.

EXAMPLE 23

Solution: Percent
  6-chloro - 3 - methyl-2-allylthio-4(3H)-quinazolinone _____ 35
  Dimethylformamide _____ 65

The ingredients are combined and stirred to produce a solution suitable for direct application.

The solution formulation of this example may be used in the manner illustrated in Example 15 with similar results.

Example 24.—Mixture of fungicides

The formulation from Example 15 is mixed in a spray tank with a formulation of methyl 1-(butylcarbamoyl)-2-benzimidazolecarbamate (benomyl). The concentration of these two materials is adjusted to 100 p.p.m. of each active ingredient. The mixture is sprayed to run-off each week on a portion of a cucumber field. Natural infections by a powdery mildew *Sphaerotheca fuliginea* which is resistant to benomyl and gummy stem blight (*Mycosphaerella citrullina*) occur throughout the growing season. At harvest the portion of the planting treated with this mixture is healthy and yields a normal crop. The untreated portion, on the other hand, yields no marketable cucumbers and the plants are practically destroyed by powdery mildew and gummy stem blight.

What is claimed is:

1. The method of preventing injury to plants by fungi which comprises applying to the locus to be protected a fungicidally effective amount of a compound of the structure

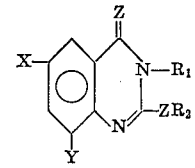

wherein:

Z is oxygen or sulfur;

X and Y are selected from the group consisting of hydrogen, halogen, alkyl of 1 to 4 carbon atoms, and alkoxy of 1 to 4 carbon atoms with the proviso that X and Y cannot both be hydrogen;

$R_1$ is alkyl of 1 to 12 carbon atoms, alkenyl of 3 to 8 carbon atoms, alkynyl of 3 to 8 carbon atoms, cycloalkyl of 3 to 8 carbon atoms, cycloalkenyl of 5 to 8 carbon atoms or cycloalkylalkyl of 4 to 9 carbon atoms; $R_1$ may be substituted with methyl, halogen, alkoxy of 1 to 2 carbon atoms, hydroxy, cyano, carboxy or alkoxy carbonyl of 2 to 3 carbon atoms;

$R_2$ is alkyl of 1 to 2 carbon atoms, alkenyl of 3 to 8 carbon atoms, alkynyl of 3 to 8 carbon atoms, cyclohexenyl, cycloalkyl of 3 to 8 carbon atoms, benzyl, cyanoalkyl of 1 to 12 carbon atoms, alkoxyalkyl of 2 to 4 carbon atoms or alkylthioalkyl of 2 to 4 carbon atoms.

2. The method of claim 1 wherein Z is sulfur.
3. The method of claim 1 wherein X is chlorine.
4. The method of claim 1 wherein Y is hydrogen.
5. The method of claim 1 wherein $R_1$ and $R_2$ are selected from the group consisting of alkyl of 1 to 4 carbon atoms, alkenyl of 3 to 4 carbon atoms and alkynyl of 3 to 4 carbon atoms.
6. The method of claim 1 wherein the compound is 6-chloro-3-allyl-2-methylthio-4(3H)-quinazolinone.

References Cited

UNITED STATES PATENTS

| 3,558,610 | 1/1971 | Breuer et al. | 424—251 X |
| 3,560,619 | 2/1971 | Harrison et al. | 424—251 |

FOREIGN PATENTS

| 483,791 | 2/1970 | Switzerland | 424—251 |

OTHER REFERENCES

Bhargaua et al.: J. Med. Chem. 12, 553–4 (1969).
Sachoeu et al.: Tetrahedron 14, 304–9 (1961).

ALBERT T. MEYERS, Primary Examiner
L. SCHENKMAN, Assistant Examiner